(12) United States Patent
Clark et al.

(10) Patent No.: US 9,319,518 B2
(45) Date of Patent: Apr. 19, 2016

(54) METHOD AND SYSTEM FOR CONFIGURING INFORMATION REGARDING PROCESSING OF CALLS INVOLVING A PARTY

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BCE INC., Montreal (CA)

(*) Notice: Subject to any disclaimer, the term of this patent is extended or adjusted under 35 U.S.C. 154(b) by 1065 days.

(21) Appl. No.: 11/993,679

(22) PCT Filed: Dec. 22, 2006

(86) PCT No.: PCT/CA2006/002116
§ 371 (c)(1),
(2), (4) Date: Jan. 25, 2010

(87) PCT Pub. No.: WO2008/077226
PCT Pub. Date: Jul. 3, 2008

(65) Prior Publication Data
US 2010/0119049 A1    May 13, 2010

(51) Int. Cl.
*H04M 3/436* (2006.01)
*H04M 3/42* (2006.01)
*H04M 3/54* (2006.01)

(52) U.S. Cl.
CPC .......... *H04M 3/42153* (2013.01); *H04M 3/436* (2013.01); *H04M 3/54* (2013.01); *H04M 2201/40* (2013.01)

(58) Field of Classification Search
USPC .................................................... 379/201.01
See application file for complete search history.

(56) References Cited

U.S. PATENT DOCUMENTS

| | | | |
|---|---|---|---|
| 6,680,935 B1 | 1/2004 | Kung et al. | |
| 6,744,759 B1 | 6/2004 | Sidhu et al. | |
| 6,950,402 B2 * | 9/2005 | Mishra | 370/252 |
| 7,076,042 B1 | 7/2006 | Praturi et al. | |
| 7,672,931 B2 | 3/2010 | Hurst-Hiller et al. | |
| 7,751,533 B2 | 7/2010 | Makela | |
| 7,921,165 B2 | 4/2011 | Pearson et al. | |
| 7,953,552 B2 | 5/2011 | Severson | |
| 8,060,555 B2 | 11/2011 | Grayson et al. | |
| 8,086,676 B2 | 12/2011 | Palahnuk et al. | |
| 8,086,842 B2 | 12/2011 | Sidhu et al. | |

(Continued)

FOREIGN PATENT DOCUMENTS

WO  PCT/CA2006/002116    9/2007

OTHER PUBLICATIONS

Examiner's Report issued Apr. 10, 2012 in connection with Canadian Patent Application 2,647,921, 2 pages.

(Continued)

*Primary Examiner* — Amal Zenati
(74) *Attorney, Agent, or Firm* — Gowling Lafleur Henderson, LLP

(57) ABSTRACT

A method implemented by a network entity. The method comprises identifying a previously-originated call involving a party. The method also comprises receiving information regarding processing of a potential future call related to the previously-originated call. The method further comprises using the information regarding processing of a potential future call related to the previously-originated call to cause configuration of call processing information associated with the party. Also provided is a configuration entity for implementing the method.

53 Claims, 6 Drawing Sheets

(56) References Cited

U.S. PATENT DOCUMENTS

| | | |
|---|---|---|
| 8,131,460 B2 | 3/2012 | Severson |
| 8,150,422 B2 | 4/2012 | Eldering |
| 8,161,419 B2 | 4/2012 | Palahnuk et al. |
| 8,166,113 B2 | 4/2012 | Costea et al. |
| 8,190,119 B2 | 5/2012 | Jabara et al. |
| 8,234,244 B2 | 7/2012 | Eldering et al. |
| 8,239,853 B2 | 8/2012 | Lee |
| 8,249,995 B2 | 8/2012 | Sheperd |
| 8,275,367 B1 | 9/2012 | Gilbert et al. |
| 2005/0157858 A1 | 7/2005 | Rajagopalan et al. |
| 2005/0180393 A1* | 8/2005 | Skubisz ............... H04L 12/66 370/352 |
| 2006/0193453 A1* | 8/2006 | Price ................... H04M 1/663 379/88.23 |
| 2007/0038720 A1 | 2/2007 | Reding et al. |
| 2008/0222127 A1 | 9/2008 | Bergin |

OTHER PUBLICATIONS

Written Opinion of the International Searching Authority mailed on Sep. 20, 2007 in connection with International Patent Application PCT/CA2006/002116.

Ditech Networks, "SBC with Far-end NAT Traversal, Inter-Carrier Peering, and Security", http://www.ditechnetworks.com/platforms/productdetail.aspx?pid=41, Dec. 22, 2009.

Notice of Allowance issued on Oct. 11, 2013 in connection with U.S. Appl. No. 12/654,574—9 pages.

Office Action issued on Jun. 6, 2013 in connection with U.S. Appl. No. 12/654,574—8 pages.

Non-Final Office Action issued on Oct. 9, 2012 in connection with U.S. Appl. No. 12/654,574, 10 pages.

* cited by examiner

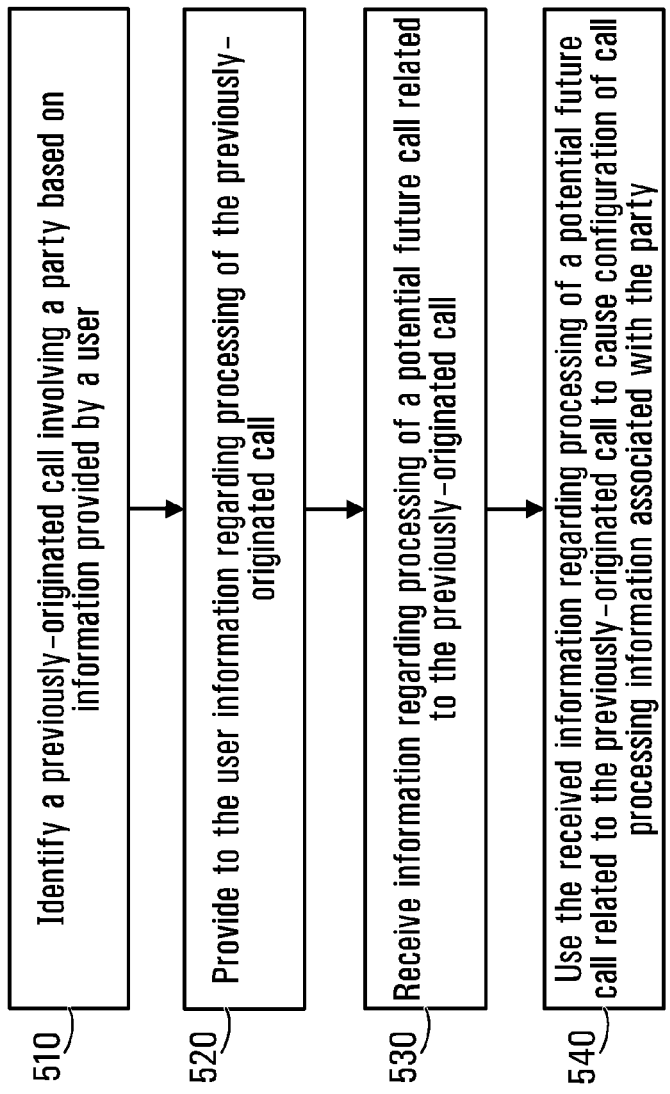

METHOD AND SYSTEM FOR CONFIGURING INFORMATION REGARDING PROCESSING OF CALLS INVOLVING A PARTY

FIELD OF THE INVENTION

The present invention relates generally to telephonic communications and, more particularly, to a method and system for configuring information regarding processing of calls involving a party, such as information regarding one or more telephony features subscribed to by the party.

BACKGROUND

Various telephony features are provided to users of communication devices to facilitate their telephonic communications. Examples of telephony features include call waiting, call forwarding, "find me/follow me" (FM/FM) call forwarding, distinctive ringing, selective call rejection, selective call acceptance, outgoing call blocking (or barring), etc.

In some cases, one or more telephony features subscribed to by a party may need to be configured in order to be applied to process calls as intended by the party. This is typically achieved by configuring information regarding processing of calls involving the party, in particular, information regarding each of these one or more telephony features.

For example, for a FM/FM call forwarding feature whereby an incoming call is to be forwarded to a plurality of communication devices respectively associated with a plurality of telephone numbers either simultaneously or sequentially (e.g., until it is answered or all the telephone numbers have been used and the call remains unanswered, in which case it can be forwarded to a voicemail system), the information regarding the FM/FM call forwarding feature may comprise the plurality of telephone numbers, a sequence in which they are to be used or an indication to use all of them simultaneously, and possibly other information (e.g., one or more periods of time during which this feature is to be applied, one or more telephone numbers associated with one or more communication entities originating calls to which this feature is to be applied, etc.). For a distinctive ringing feature whereby incoming calls destined for a communication device are to be announced by different audio signals (e.g., ring tones or songs) produced by the communication device when they originate from communication entities associated with specific telephone numbers, the information regarding the distinctive ringing feature may comprise, for each of the communication entities, the specific telephone number associated therewith and information regarding a specific audio signal to be produced when an incoming call originates therefrom, and possibly other information. For an outgoing call barring feature whereby an outgoing call originating from a communication device and destined for any of one or more communication entities, each associated with a predetermined telephone number, is to be prevented from being established, the information regarding the outgoing call barring feature may comprise, for each of the one or more communication entities, the predetermined telephone number associated therewith. Various other examples of information regarding a given telephony feature are possible for other telephony features.

Thus, when one or more telephony features subscribed to by a party need to be configured, the party is usually required to interact with a representative, an interactive voice response (IVR) unit, or a data network site (e.g., a web site) associated with a provider of these features in order to configure information regarding each of these features. In some situations, this process can be inconvenient, impractical and/or inefficient. For example, when initially provisioning a particular telephony feature (e.g., a FM/FM call forwarding feature) for which the information regarding that feature may need to cover various scenarios (e.g., origin and time of incoming calls, sequence of telephone numbers to use, etc.), the party may be required to think of and consider these scenarios ahead of time in order to provide all the information for correct application of that feature. This is often not readily achievable and can result in the party needing to modify the information one or more times in order to cause correct application of the particular telephony feature. Moreover, when realizing that a change needs to be made to how the particular telephony feature is applied, the party may not be in a position to immediately interact with the representative, IVR unit, or data network site to effect the change. This may result in the party forgetting that the change needs to be made and the change not being effected. In these and other situations, it is apparent that existing ways of configuring telephony features are inconvenient, impractical and/or inefficient.

There thus exists a need for improvements directed to facilitating configuration of information regarding processing of calls involving a party, in particular, information regarding one or more telephony features subscribed to by the party.

SUMMARY OF THE INVENTION

As embodied and broadly described herein, the invention provides a method implemented by a network entity. The method comprises identifying a previously-originated call involving a party. The method also comprises receiving information regarding processing of a potential future call related to the previously-originated call. The method further comprises using the information regarding processing of a potential future call related to the previously-originated call to cause configuration of call processing information associated with the party.

The invention also provides a configuration entity. The configuration entity comprises a communication unit. The communication unit is operative for identifying a previously-originated call involving a party. The communication unit is further operative for receiving information regarding processing of a potential future call related to the previously-originated call. The configuration entity also comprises a configuration unit. The configuration unit is operative for using the information regarding processing of a potential future call related to the previously-originated call to cause configuration of call processing information associated with the party.

The invention also provides a computer-readable storage medium comprising a program element for execution by a processing unit to implement a configuration entity. The program element comprises first program code for identifying a previously-originated call involving a party. The program element also comprises second program code for receiving information regarding processing of a potential future call related to the previously-originated call. The program element further comprises third program code for using the information regarding processing of a potential future call related to the previously-originated call to cause configuration of call processing information associated with the party.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings, in which:

FIG. 6 illustrates an example of operation of the configuration entity shown in FIG. 5.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
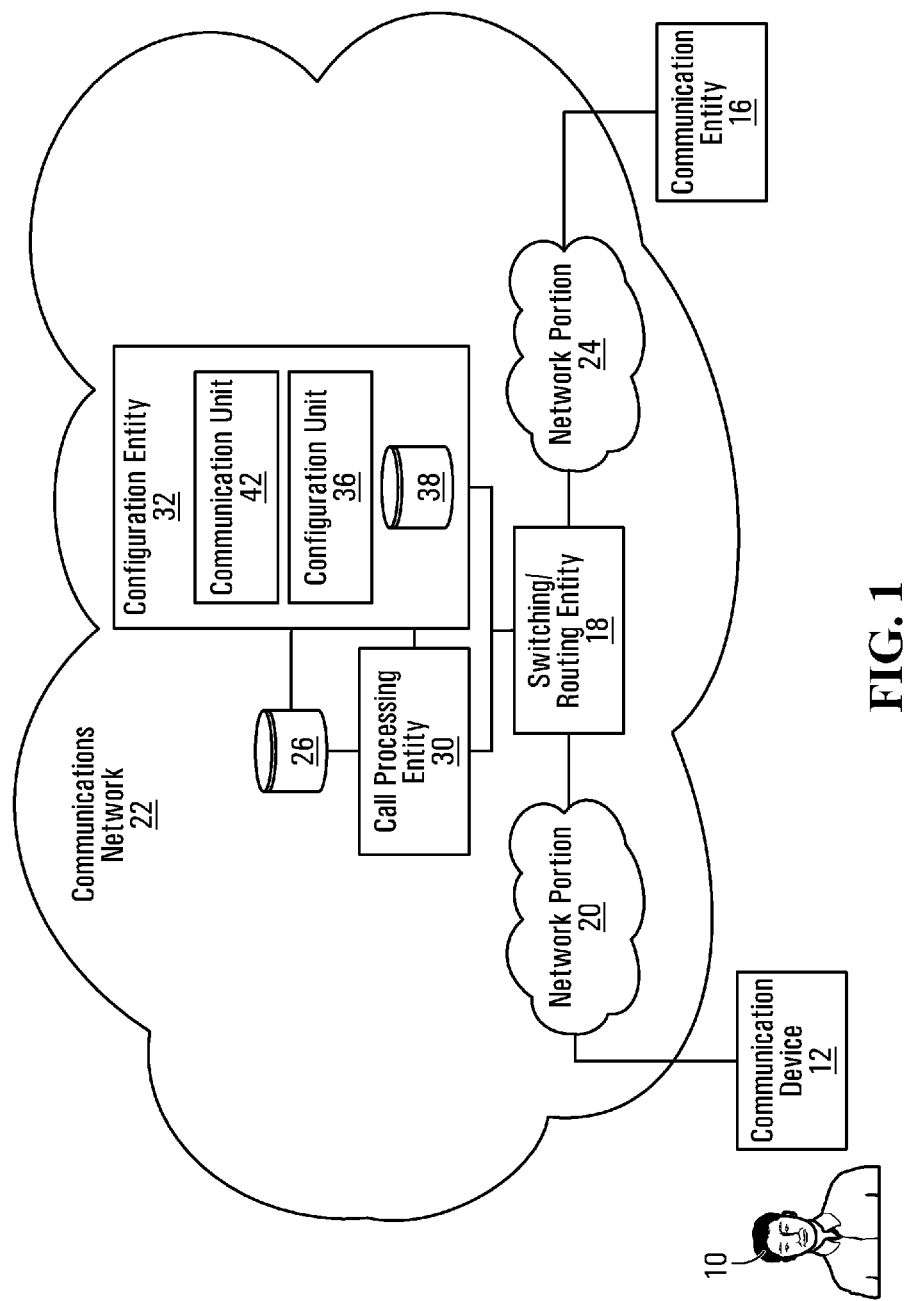
FIG. 1 illustrates a system comprising a configuration entity that enables configuration of information regarding processing of calls involving a party, in accordance with an embodiment of the present invention.

FIG. 1 depicts a communication device 12 that may be employed by a user 10 to effect telephonic communications, including handling an incoming call originating from a calling party device, originating an outgoing call destined for a called party device, and participating in a call in progress. For example, in various embodiments, the communication device 12 may be a wired Plain Old Telephony System (POTS) phone (including a cordless phone), a wireless phone (e.g., a cellular phone or other mobile communication device including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software), or a telephony-enabled television (TV) unit (e.g., a set-top box connected to a television and a remote control). Depending on functionality of the communication device 12, a call originated by, destined for, or in progress at the communication device 12 may be a voice call, a video call, a multimedia call, or any other type of call.

The communication device 12 is connected to a switching/routing entity 18 via a first network portion 20 of a communications network 22. The switching/routing entity 18 enables the communication device 12 to reach or be reached by any of various communication entities, one of which is represented as reference number 16 (other communication entities are not shown for the sake of simplicity). For example, in possible scenarios, the communication entity 16 may be a telephone (e.g., a wired POTS, wireless, VoIP, or soft phone), a telephony-enabled TV unit, or a voicemail system. The communication entity 16 is connected to the switching/routing entity 18 via a second network portion 24 of the communications network 22.

The communications network 22 may comprise a portion of one or more of the Public Switched Telephone Network (PSTN), a wireless network (e.g., a cellular network), and a data network (e.g., the Internet).

The nature of the first network portion 20 and the switching/routing entity 18 will depend on the nature of the communication device 12 and where the switching/routing entity 18 resides in the communications network 22. For example, where the communication device 12 is a wired POTS phone and the switching/routing entity 18 resides in the PSTN, the first network portion 20 may comprise a telephone line in the PSTN and the switching/routing entity 18 may be part of a central office switch. In another example, where the communication device 12 is a wireless phone and the switching/routing entity 18 resides in a wireless network, the first network portion 20 may comprise a wireless link in combination with a base station and a network-side wireline link, and the switching/routing entity 18 may be part of a mobile switching center. In yet another example, where the communication device 12 is a VoIP phone (or a POTS phone equipped with an ATA) and the switching/routing entity 18 resides in a data network, the first network portion 20 may comprise a digital communications link (e.g., Ethernet) and the switching/routing entity 18 may be part of a router (e.g., an edge router or a core router) or a softswitch. In yet another example, where the communication device 12 is a soft phone, the first network portion 20 may comprise a digital communications link (e.g., a digital subscriber line (DSL) link or a coaxial cable) and the switching/routing entity 18 may be part of a server equipped with a modem. It will be appreciated that various other implementations of the first network portion 20 and the switching/routing entity 18 are possible (e.g., where the communication device 12 is a telephony-enabled TV unit). It will also be appreciated that the first network portion 20 may span across different networks (i.e., PSTN, wireless, and/or data) in which case it may comprise one or more gateways enabling communication and interoperability between these networks. Such gateways are well known to those skilled in the art and need not be described in further detail.

Similarly, the nature of the second network portion 24 will depend on the nature of the communication entity 16 and where the switching/routing entity 18 resides in the communications network 22. Thus, like the first network portion 20, the second network portion 24 may comprise, for example, one or more of a telephone line in the PSTN, a wireless link in combination with a base station and a network-side wireline link, a digital communications link, and one or more gateways enabling communication and interoperability between different networks.

The switching/routing entity 18 is operative to effect switching/routing operations to help route an outgoing call originated at the communication device 12 and destined for a called party device (such as the communication entity 16). In addition, the switching/routing entity 18 is operative to effect switching/routing operations to help route an incoming call originated at a calling party device (such as the communication entity 16) and destined for the communication device 12. Furthermore, the switching/routing entity 18 is communicatively coupled to a call processing entity 30, which is described later on, and interacts therewith when the communication device 12 originates an outgoing call, handles an incoming call, or participates in a call in progress. The switching/routing entity 18 comprises suitable hardware, firmware, software, control logic, or a combination thereof for implementing its functionality.

Figure 2:
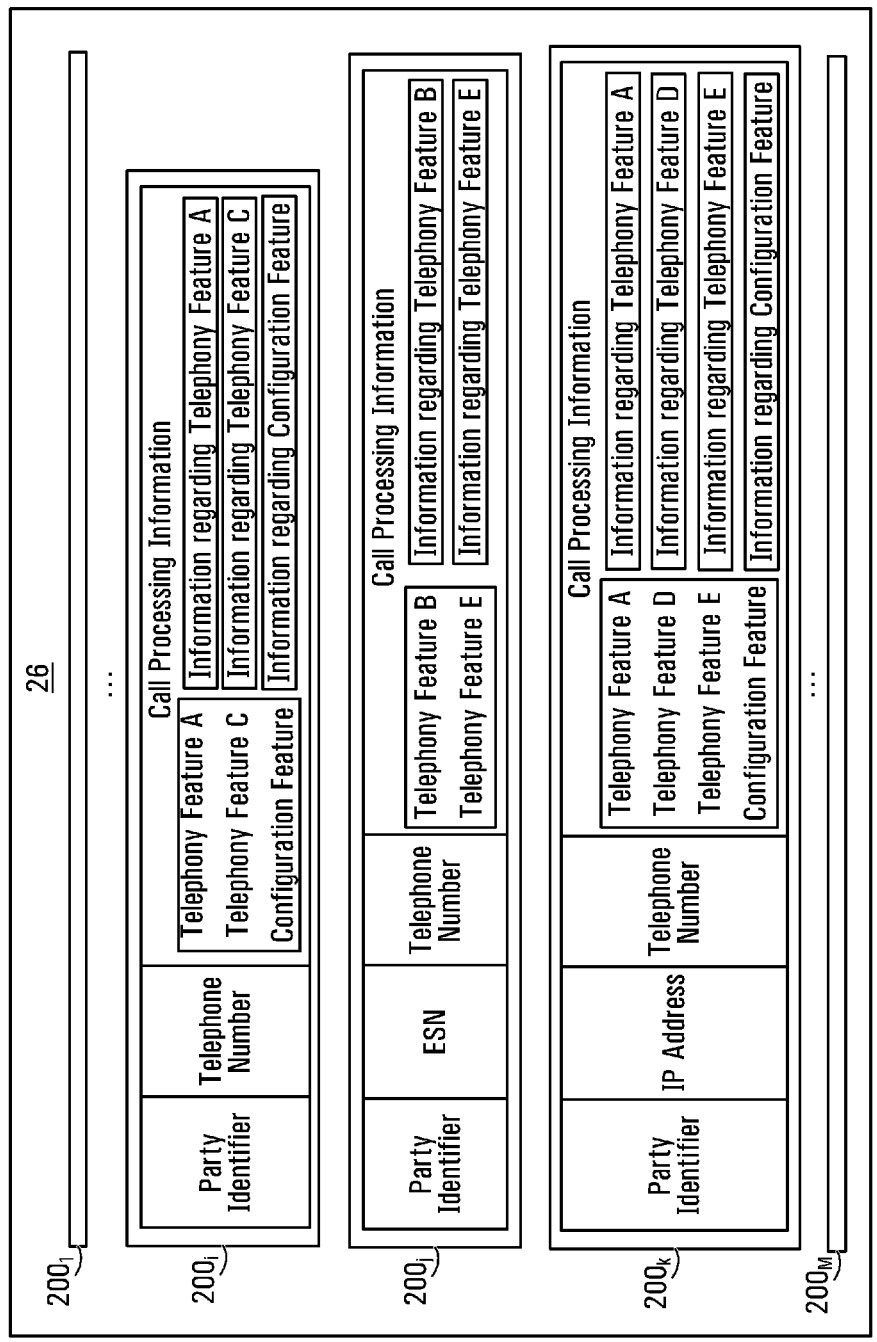
FIG. 2 illustrates an example of potential contents of a database of the system shown in FIG. 1.

The call processing entity 30 is communicatively coupled to a database 26. FIG. 2 shows an example of potential contents of the database 26. In this example, the database 26 stores a plurality of records $200_1$-$200_M$ each associated with a respective party (such as the user 10) which may be a potential calling party as well as a potential called party. In this case, the record $200_i$ stores an association between a party and a telephone number identifying a telephone line associated with a wired POTS phone expected to be used by that party to effect telephonic communications. The record $200_j$ stores an association between a party and an electronic serial number (ESN) and telephone number that are associated with a wireless phone expected to be used by that party to effect telephonic communications. The record $200_k$ stores an association between a party and an IP address and telephone number (and/or another Uniform Resource Identifier (URI) such as a Session Initiation Protocol (SIP) URI) that are associated with a VoIP phone, ATA-equipped POTS phone, or softphone expected to be used by that party to effect telephonic communications. It will be recognized that other forms of content are possible for records in the database 26.

In this example, each of the records $200_1$-$200_M$ in the database 26 also includes call processing information associated with the given party that is associated with that record. This call processing information indicates how calls involving the given party, i.e., calls originated by or destined for a communication device associated with the given party, are to be processed by the call processing entity 30. It is configurable in order to cause processing of calls involving the given party as intended by the given party.

The call processing information associated with a given party can take on many forms. In this embodiment, for each of the records $200_1$-$200_M$, the call processing information associated with the party that is associated with that record comprises telephony feature information associated with that party. For each of the records $200_1$-$200_M$, the telephony feature information associated with the party that is associated with that record comprises information indicative of whether the party subscribes to one or more telephony features and information regarding each of such one or more telephony features. This telephony feature information is used during processing of calls by the call processing entity 30 in order to apply any telephony feature subscribed to by the respective party as intended by the respective party. Subscription to different telephony features may be completely independent from one party to another and there is no restriction on a number or combination of features that may be subscribed to by any one party. In some cases, a party may not subscribe to any telephony feature, while in other cases a party may subscribe to all available telephony features.

Examples of available telephony features include:
- a call forwarding feature, whereby every incoming call destined for a first communication device associated with a first identifier (e.g., a first telephone number, IP address, or SIP URI) is to be forwarded to a second communication device associated with a second identifier (e.g., a second telephone number, IP address, or SIP URI);
- a selective call forwarding feature, whereby an incoming call originated by any of one or more communication entities each associated with a predetermined identifier (e.g., a predetermined telephone number, IP address, or SIP URI) and destined for a first communication device associated with a first identifier (e.g., a first telephone number, IP address, or SIP URI) is to be forwarded to a second communication device associated with a second identifier (e.g., a second telephone number, IP address, or SIP URI);
- a no-answer call forwarding feature, whereby an incoming call destined for a first communication device associated with a first identifier (e.g., a first telephone number, IP address, or SIP URI) is to be forwarded to a second communication device associated with a second identifier (e.g., a second telephone number, IP address, or SIP URI) if it is not answered within a predetermined period of time (e.g., ringing cycle);
- a "find me/follow me" (FM/FM) call forwarding feature, whereby an incoming call is to be forwarded to a plurality of communication devices respectively associated with a plurality of identifiers (each of which may be, for example, a telephone number, IP address, or SIP URI) either simultaneously or sequentially (e.g., until it is answered or all the identifiers have been used and the call remains unanswered, in which case it can be forwarded to a voicemail system);
- a first distinctive ringing feature, whereby incoming calls destined for a communication device are to be announced by different audio signals (e.g., ring tones or songs) produced by the communication device when they originate from communication entities associated with specific identifiers (each of which may be, for example, a telephone number, IP address, or SIP URI);
- a second distinctive ringing feature, whereby incoming calls destined for a communication device associated with a plurality of telephone numbers are to be announced by different audio signals, produced by the communication device depending on which one of the telephone numbers was used in originating them;
- a selective call rejection feature, whereby an incoming call originated by any of one or more communication entities each associated with a predetermined identifier (e.g., a predetermined telephone number, IP address, or SIP URI) and destined for a communication device is prevented from reaching the communication device;
- a selective call acceptance feature, whereby only an incoming call originated by any of one or more communication entities each associated with a predetermined identifier (e.g., a predetermined telephone number, IP address, or SIP URI) and destined for a communication device is allowed to reach the communication device;
- a call waiting feature, whereby a communication device participating in a call in progress produces a notification of an incoming call destined for the communication device;
- a distinctive ringing call waiting feature, whereby a communication device participating in a call in progress produces a distinctive audio notification of an incoming call destined for the communication device and originated by any of one or more communication entities each associated with a specific identifier (e.g., a specific telephone number, IP address, or SIP URI);
- a calling line identification (CLID) displaying feature, whereby CLID information (e.g., a telephone number and/or a name or other party identifier) associated with a communication entity originating a call destined for a communication device is displayed by the communication device;
- a TV CLID displaying feature, whereby CLID information associated with a communication entity originating a call destined for a communication device is displayed by a TV unit associated with the communication device (or by the communication device itself in cases where the communication device is a telephony-enabled TV unit);
- a CLID blocking feature, whereby CLID information (e.g., a telephone number and/or a name or other party identifier) associated with a communication device originating an outgoing call destined for a communication entity is not provided to the communication entity;
- a speed calling feature, whereby an outgoing call destined for any of one or more communication entities each associated with a predetermined telephone number can be originated by inputting to a communication device a specific code (e.g., a one or two digit code) shorter than the predetermined telephone number associated with the communication entity for which the outgoing call is destined; and an outgoing call barring feature, whereby an outgoing call originating from a communication device and destined for any of one or more communication entities each associated with a predetermined identifier (e.g., a predetermined telephone number, IP address, or SIP URI) is to be prevented from being established.

It is to be understood that these examples of telephony features are presented for illustrative purposes only and are not to be considered limiting in any respect as various other telephony features are or may become available.

The nature of the information regarding a given telephony feature can take on various forms depending on the nature of the given telephony feature. For example:

for the aforementioned call forwarding feature, the information regarding the call forwarding feature may comprise the second identifier and possibly other information (e.g., one or more periods of time during which this feature is to be applied);

for the aforementioned selective call forwarding feature, the information regarding the selective call forwarding feature may comprise the second identifier, the predetermined identifier associated with each of the one or more communication entities, and possibly other information (e.g., one or more periods of time during which this feature is to be applied);

for the aforementioned no-answer call forwarding feature, the information regarding the no-answer call forwarding feature may comprise the second identifier, the predetermined period of time for answering an incoming call, and possibly other information (e.g., one or more periods of time during which this feature is to be applied);

for the aforementioned FM/FM call forwarding feature, the information regarding the FM/FM call forwarding feature may comprise the plurality of identifiers, a sequence in which they are to be used or an indication to use all of them simultaneously, and possibly other information (e.g., one or more periods of time during which this feature is to be applied, one or more identifiers associated with one or more communication entities originating calls to which this feature is to be applied, telephony presence information (e.g., "busy", "do not disturb", etc.) associated with each of the plurality of communication devices, etc.);

for the aforementioned first distinctive ringing feature, the information regarding the first distinctive ringing feature may comprise, for each of the communication entities, the specific identifier associated therewith, information regarding a specific audio signal to be produced when an incoming call originates therefrom, and possibly other information (e.g., one or more periods of time during which this feature is to be applied);

for the aforementioned second distinctive ringing feature, the information regarding the second distinctive ringing feature may comprise, for each of the telephone numbers, information regarding a specific audio signal to be produced to announce an incoming call originated using that telephone number and possibly other information (e.g., one or more periods of time during which this feature is to be applied);

for the aforementioned selective call rejection feature, the information regarding the selective call rejection feature may comprise the predetermined identifier associated with each of the one or more communication entities, and possibly other information (e.g., one or more periods of time during which this feature is to be applied);

for the aforementioned selective call acceptance feature, the information regarding the selective call acceptance feature may comprise the predetermined identifier associated with each of the one or more communication entities, and possibly other information (e.g., one or more periods of time during which this feature is to be applied);

for the aforementioned distinctive ringing call waiting feature, the information regarding the distinctive ringing call waiting feature may comprise, for each of the one or more communication entities, the specific identifier associated therewith, information regarding an audio notification to be produced to announce an incoming call originated therefrom, and possibly other information (e.g., one or more periods of time during which this feature is to be applied);

for the aforementioned speed calling feature, the information regarding the speed calling feature may comprise, for each of the one or more communication entities, the predetermined telephone number associated therewith, the specific code, and possibly other information (e.g., one or more periods of time during which this feature is to be applied); and for the aforementioned outgoing call barring feature, the information regarding the outgoing call barring feature may comprise, for each of the one or more communication entities, the predetermined identifier associated therewith and possibly other information (e.g., one or more periods of time during which this feature is to be applied).

It is to be understood that these examples of information regarding a telephony feature are presented for illustrative purposes only and are not to be considered limiting in any respect as other information regarding a telephony feature is possible.

In accordance with an embodiment of the present invention, the database 26 stores information on whether a particular party subscribes to a "configuration feature". As further detailed later on, this configuration feature allows a party to conveniently and efficiently effect configuration of call processing information associated with the party (which comprises, in this case, telephony feature information associated with the party) on a basis of knowledge of a previously-originated call involving the party. In this example, the parties associated with the records $200_i$ and $200_k$ subscribe to the configuration feature contemplated herein, while the party associated with the records $200_j$ does not. It is to be understood that, in other embodiments, all parties may benefit from the configuration feature contemplated herein without needing to subscribe thereto, in which case the database 26 may not include information on whether a particular party subscribes to the configuration feature.

With renewed reference to FIG. 1, the call processing entity 30 is operative to interact with the switching/routing entity 18 and the database 26 in order to effect various call processing operations when a communication device (such as the communication device 12) connected to the switching/routing entity 18 is destined to receive an incoming call, originates an outgoing call, or participates in a call in progress.

More particularly, the call processing entity 30 is operative to process calls arriving at the switching/routing entity 18. Processing of a given call by the call processing entity 30 can be viewed as the call processing entity 30 performing one or more operations to process the given call. In this embodiment, the call processing entity 30 is operative to process calls in accordance with a set of rules. Each rule may be defined by a condition, an operation to be performed if the condition is satisfied for a given call, and an operation to be performed if the condition is not satisfied for a given call (e.g., <condition> <operation to be performed if condition is satisfied> <operation to be performed if condition is not satisfied>). For a given rule, the condition may be defined in terms of one or more characteristics of a call. Examples of characteristics of a call are: its origin, which may be expressed, for instance, as a telephone number or other identifier (e.g., an IP address or SIP URI) associated with a device that originated the call; its intended destination, which may be expressed, for instance, as a telephone number or other identifier (e.g., an IP address or SIP URI) associated with a device for which the call is destined; and a time at which it was originated (e.g., a date, hour, minute, etc.). For a given rule, the condition may also be defined in terms of call processing information (in this case, telephony feature information) that is included in the records $200_1$-$200_M$ of the database 26. For a given rule, the operations to be performed based on whether the condition is satisfied depends on the nature of the given rule (e.g., route a call to its intended destination, forward a call in accordance with a call forwarding feature, cause production of an audio signal in accordance with a distinctive ringing feature, prevent establishment of an outgoing call in accordance with an outgoing call barring feature, etc.). The call processing entity 30 comprises suitable hardware, firmware, software, control logic, or a combination thereof for implementing its functionality.

Continuing with FIG. 1, in accordance with an embodiment of the present invention, a configuration entity 32 associated with the configuration feature contemplated herein is communicatively coupled to the switching/routing entity 18, the call processing entity 30, and the database 26. As further detailed later on, the configuration entity 32 enables a given party to conveniently and efficiently effect configuration of call processing information associated with the given party (which comprises, in this case, telephony feature information associated with the given party) on a basis of knowledge of a previously-originated call involving the given party (i.e., a call that has been previously originated by a communication device associated with the given party or that has been previously originated by a communication device associated with another party and destined for a communication device associated with the given party). This in effect allows the given party to indicate how potential future calls related to the previously-originated call are to be processed. In this embodiment, the configuration entity 32 comprises suitable hardware, firmware, software, control logic, or a combination thereof for implementing a plurality of functional units, including a communication unit 42, a configuration unit 36 and a memory unit 38, whose functionality will be described further below.

In some embodiments, the switching/routing entity 18, the call processing entity 30, the database 26, and the configuration entity 32 may reside in a common network element of the communications network 22. In such embodiments, links between these components may be physical (i.e., wired or wireless) links or logical links. In other embodiments, different ones of the switching/routing entity 18, the call processing entity 30, the database 26, and the configuration entity 32 may reside in different network elements of the communications network 22 that are interconnected via one or more physical links and possibly other elements (e.g., gateways) of the communications network 22. Also, although it is depicted in FIGS. 1 and 2 as being one component, the database 26 may be distributed in nature, i.e., it can have portions of its content stored in different memory units possibly located in different network elements of the communications network 22. For example, the call processing information shown in FIG. 2 may be stored in a memory unit dedicated to storing this information and distinct from a memory unit that stores other contents of the database 26 shown in FIG. 2.

For illustrative purposes, it is assumed that the user 10 associated with the communication device 12 subscribes to the configuration feature contemplated herein. Under this assumption, interaction between the switching/routing entity 18, the call processing entity 30, the database 26, and, in particular, the configuration entity 32 will now be described in the context of an example in which a call previously originated by the communication entity 16 arrives at the switching/routing entity 18 and will ultimately reach the communication device 12. In describing this example, this call will sometimes be referred to as "the previously-originated call".

Upon arrival of the previously-originated call at the switching/routing entity 18, the call processing entity 30 detects the call and processes it. As part of this process, the call processing entity 30 determines, based on destination information accompanying the call (e.g., a destination telephone number), that the call is destined for the communication device 12 or possibly another communication device associated with the user 10.

In this embodiment, the call processing entity 30 processes the previously-originated call in accordance with the aforementioned set of rules. For one or more of these rules, the call processing entity 30 may have to use one or more elements of the call processing information associated with the user 10. More particularly, in this case, for one or more of these rules, the call processing entity 30 may have to determine whether the user 10 subscribes to one or more telephony features and, if so, to obtain information regarding these one or more telephony features. To that end, the call processing entity 30 consults the database 26 to retrieve from the particular one of the records $200_1$-$200_M$ associated with the user 10 information indicative of whether the user 10 subscribes to one or more telephony features and possibly information regarding one or more of these telephony features.

It is recalled that, in this example, the user 10 subscribes to the configuration feature contemplated herein. In addition, for purposes of this example, it is assumed that the user 10 subscribes to at least one other telephony feature, say two (2) other telephony features respectively denoted telephony features X and Y. Thus, the call processing entity 30 uses the telephony feature information included in the particular one of the records $200_1$-$200_M$ associated with the user 10 in order to process the previously-originated call. Specifically, in this case, the call processing entity 30 uses the information regarding the telephony features X and Y included in the particular one of the records $200_1$-$200_M$ associated with the user 10 in order to process the previously-originated call.

As the previously-originated call is processed by the call processing entity 30, and knowing that the user 10 subscribes to the configuration feature contemplated herein, the call processing entity 30 causes the configuration entity 32 to keep a record of how that call has been processed by the call processing entity 30. More particularly, in this embodiment, the configuration entity 32 creates in the memory unit 38 a record associated with the previously-originated call and including information regarding one or more operations performed to process that call. It will be appreciated that, in embodiments where all parties may benefit from the configuration feature contemplated herein without needing to subscribe thereto, the configuration entity 32 may create in the memory unit 38 a record associated with every previously-originated call and including information regarding one or more operations performed to process that call.

Figure 3:
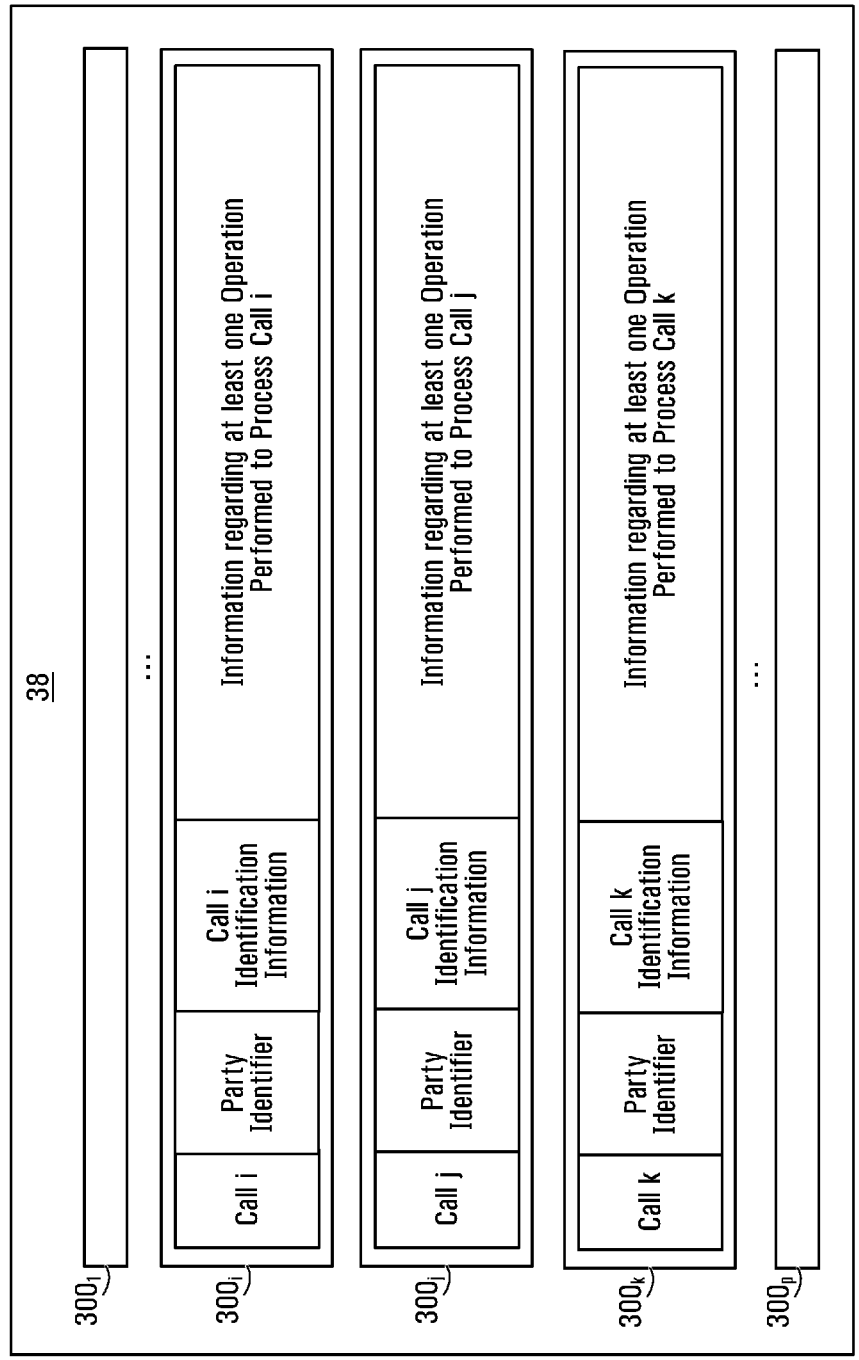
FIG. 3 illustrates an example of potential contents of a memory unit of the configuration entity shown in FIG. 1.

FIG. 3 shows an example of potential contents of the memory unit 38. In this example, the memory unit 38 stores a plurality of records $300_1$-$300_P$ each associated with a previously-originated call involving a party (such as the user 10) and that has been processed by the call processing entity 30. Each of the records $300_1$-$300_P$ includes a party identifier that identifies the party associated with the previously-originated call that is associated with that record. Each of the records $300_1$-$300_P$ also includes information identifying the previously-originated call associated with that record. This information may comprise a telephone number or other identifier (e.g., an IP address or SIP URI) associated with an origin of that call, a telephone number or other identifier (e.g., an IP address or SIP URI) associated with an intended destination of that call, a time at which that call was originated, and/or other information that uniquely identifies that call (e.g., an index, an identification number, an alphanumeric identifier, etc.). Each of the records $300_1$-$300_P$ also includes information regarding one or more operations performed to process the previously-originated call associated with that record. This information can be viewed as a log or history of what has been done to process that call.

Thus, the configuration entity 32 creates in the memory unit 38 a particular record associated with the previously-originated call under consideration in this example. The particular record includes a party identifier that identifies the user 10 and information that identifies the previously-originated call. This information may comprise the telephone number or other identifier (e.g., an IP address or SIP URI) associated with the communication entity 16 that originated the previously-originated call, the telephone number or other identifier (e.g., an IP address or SIP URI) associated with the communication device 12 (or possibly another communication device associated with the user 10) for which the call is destined, a time at which the previously-originated call was originated, and/or other information that uniquely identifies the previously-originated call. The particular record also includes information regarding one or more operations performed to process the previously-originated call. Since in this example the user 10 subscribes to the telephony features X and Y, at least some of these one or more operations will have been performed on a basis of the telephony feature information included in the particular one of the records $200_1$-$200_M$ associated with the user (specifically, in this case, the information regarding the telephony features X and Y included in the particular one of the records $200_1$-$200_M$).

Figure 4:
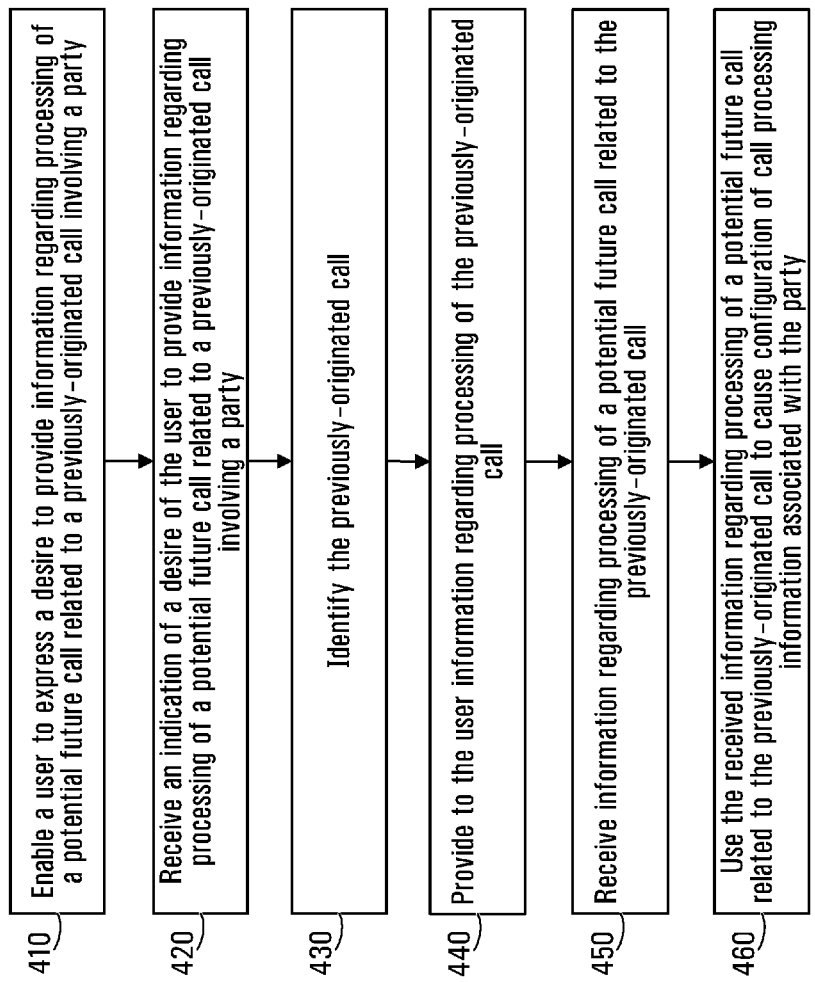
FIG. 4 illustrates an example of operation of the configuration entity shown in FIG. 1.

As a result of processing of the previously-originated call by the call processing entity 30, it is assumed, for purposes of this example, that the call arrives at the communication device 12. It is further assumed that the call is answered by the user 10 who engages in a conversation with a party (not shown) associated with the communication entity 16, and ends after a certain period of time, for instance, with the user 10 or the party associated with the communication entity 16 hanging up. Under this assumption, an example of operation of the configuration entity 32 will now be described with additional reference to FIG. 4.

Step 410

In this example, right after the previously-originated call ends, the configuration entity 32, in this case the communication unit 42, enables the user 10 to express a desire to provide information regarding processing of potential future calls related to the previously-originated call.

A potential future call related to a previously-originated call is a call that can potentially occur (i.e., that may or may not occur) at a later time and that has at least one characteristic in common with the previously-originated call. For example, such a characteristic may be: an origin of the previously-originated call and the potential future call, which may be expressed, for instance, as a telephone number or other identifier (e.g., an IP address or SIP URI) associated with a communication device from which each of these calls has been originated; an intended destination of the previously-originated call and the potential future call, which may be expressed, for instance, as a telephone number or other identifier (e.g., an IP address or SIP URI) associated with a communication device for which each of these calls is or was destined for; an origination time of the previously-originated call and the potential future call, which may be expressed, for instance, as a time of day, weekday, particular period of time, etc., during which each of these calls has been originated; an unknown origin of the previously-originated call and the potential future call, which may be expressed, for instance, as a lack of CLID information for each of these calls; etc. It will be appreciated that the potential future call may share one or more other characteristics with the previously-originated call.

Enabling the user 10 to express a desire to provide information regarding processing of potential future calls related to the previously-originated call can be effected in many ways in various embodiments.

In some embodiments, the communication unit 42 may implement an interactive voice response (IVR) module that enables the user 10 to express a desire to provide information regarding processing of potential future calls related to the previously-originated call by sending a voice message to the communication device 12. The voice message is suitable for eliciting from the user 10 an indication as to whether he/she desires to provide information regarding processing of potential future calls related to the previously-originated call (e.g., "Would you like for future related calls to be processed differently?"; "Would you like to indicate how future related calls are to processed?"; etc.). The user 10 may then speak an utterance (e.g., "yes" or "no") conveying an indication as to whether he/she desires to provide information regarding processing of potential future calls related to the previously-originated call.

In other embodiments, the communication device 12 may have a display and the communication unit 42 may enable the user 10 to express a desire to provide information regarding processing of potential future calls related to the previously-originated call by sending a signal to the communication device 12 to cause displaying on its display of text or other graphical elements eliciting from the user 10 an indication as to whether he/she desires to provide such information (e.g., "To indicate how future related calls should be processed, press 1."; "Press * if you would like for future related calls to be processed differently."; etc.). The user 10 may then press on one or more buttons of the communication device 12 or otherwise tactilely interact therewith to cause transmission to the communication unit 42 of a signal conveying an indication as to whether he/she desires to provide information regarding processing of potential future calls related to the previously-originated call.

In these embodiments, transmission to the communication device 12 of the voice message and/or the signal to cause display of text or other graphical elements may be effected automatically by the communication unit 42 right after the previously-originated call ends, without requiring any input from the user 10. This automatic transmission may be effected by the communication unit 42 for any previously-originated call (such as the one under consideration in this example). Alternatively, the communication unit 42 may effect this automatic transmission for a given previously-originated call only when one or more conditions are satisfied. For example, the one or more conditions may be defined in terms of the information regarding one or more operations performed to process the given previously-originated call that is included in the particular one of the records $300_1$-$300_P$ of the memory unit 38 that is associated with that call (e.g., if a relatively large number of operations have been performed to process the given previously-originated call, the communication unit 42 may proceed with effecting this automatic transmission). As another example, the one or more conditions may be defined in terms of one or more characteristics of the given previously-originated call (e.g., if the given previously-originated call has an origin, intended destination, and/or origination time being encountered for the first time by the configuration entity 32, the communication unit 42 may proceed with effecting this automatic transmission).

In yet other embodiments, the communication unit 42 may enable the user 10 to express a desire to provide information regarding processing of potential future calls related to the previously-originated call by being attentive to receipt of a signal generated by the communication device 12 and indicative of a desire of the user 10 to provide such information. For example, if the user 10 desires to provide information regarding processing of potential future calls related to the previously-originated call, he/she may speak one or more utterances and/or may press on one or more buttons of the communication device 12 (e.g., to enter an input command such as "*12") or otherwise tactilely interact therewith in order to cause transmission to the communication unit 42 of a signal conveying an indication of a desire of the user 10 to provide such information.

For purposes of this example, it is assumed that the user 10 indeed desires to provide information regarding processing of potential future calls related to the previously-originated call. Accordingly, the user 10 expresses this desire by speaking one or more utterances and/or pressing on one or more buttons of the communication device 12 or otherwise tactilely interacting therewith, as the case may be, resulting in transmission to the communication unit 42 of a signal conveying an indication that the user 10 desires to provide information regarding processing of potential future calls related to the previously-originated call.

Step 420

The communication unit 42 receives the signal conveying the indication that the user 10 desires to provide information regarding processing of potential future calls related to the previously-originated call.

Step 430

The communication unit 42 identifies the previously-originated call.

In this example, where the user 10 expressed a desire to provide information regarding processing of potential future calls related to the previously-originated call right after that call ended, the communication unit 42 may identify the previously-originated call in question by virtue of knowing that it is the one that just ended. Alternatively, the communication unit 42 may identify the previously-originated call by accessing the memory unit 38 in order to identify the particular one of the records $300_1$-$300_P$ that is associated with the most recent call associated with the user 10.

In other cases, the communication unit 42 may identify a previously-originated call involving a party on a basis of information enabling identification of that call that is received as a result of interaction of a user (such as the user 10) with a communication device (such as the communication device 12). This information may comprise a telephone number or other identifier associated with an origin of the previously-originated call, a telephone number or other identifier associated with an intended destination of the previously-originated call, an origination time of the previously-originated call, and/or other information that uniquely identifies the previously-originated call. It may be received by the communication unit 42 as a result of the user speaking one or more utterances (possibly in response to one or more voice messages (e.g., questions) sent by the communication unit 42) and/or pressing on one or more buttons of his/her communication device (such as the communication device 12) or otherwise tactilely interacting therewith. Based on the received information, the communication unit 42 may proceed to access the memory unit 38 in an attempt to locate a particular one of the records $300_1$-$300_P$ that is associated with the previously-originated call, thereby identifying it.

Although it appears in this example as occurring after the configuring entity 32 enabled the user 10 to express a desire to provide information regarding processing of potential future calls related to the previously-originated call, it will be appreciated that this step of identifying the previously-originated call may occur before or concurrently with the configuring entity 32 enabling the user 10 to express such a desire.

Step 440

Having identified the previously-originated call, the communication unit 42 provides to the user 10 information regarding processing of the previously-originated call. This information enables the user 10 to learn (or confirm his/her understanding of) how the previously-originated call has been processed, e.g., to learn about (or confirm his/her understanding of) one or more operations performed to process that call.

The information regarding processing of the previously-originated call may take on various forms depending on what was actually done to process that call. For instance, and for purposes of this example, assume that the telephony feature X is the aforementioned FM/FM call forwarding feature and that the telephony feature Y is the aforementioned first distinctive ringing feature. Under this assumption, the information regarding processing of the previously-originated call may convey to the user 10, for example: an origin of the call (e.g., a telephone number or other identifier associated with the communication entity 16); the one or more telephone numbers or other identifiers used in order for the call to ultimately reach the communication device 12; if more than telephone one number or other identifier was used, a sequence in which these one or more telephone numbers or other identifiers have been used or an indication that they were all used simultaneously; an indication that a specific audio signal (e.g., ring tone or song) was or was not produced by the communication device 12 to announce the call because the call originates from the communication entity 16 which is or is not associated with a specific telephone number or other identifier for which that specific audio signal is to be used; and possibly other information as to how the call has been processed.

The above example of information regarding processing of the previously-originated call is presented for illustrative purposes only and is not to be considered limiting in any respect as it will be appreciated that information regarding processing of a given previously-originated call may convey various information elements depending on how the given previously-originated call was actually processed.

In order to provide to the user 10 the information regarding processing of the previously-originated call, in this embodiment, the communication unit 42 retrieves from the particular one of the record $300_1$-$300_P$ associated with that call the information regarding one or more operations performed to process that call and uses it to derive the information regarding processing of that call. Where the communication unit 42 implements an IVR module, the communication unit 42 may provide to the user 10 the information regarding processing of the previously-originated call by sending one or more voice messages to the communication device 12 that convey that information. Where the communication device 12 has a display, the communication unit 42 may provide to the user 10 the information regarding processing of the previously-originated call by sending one or more signals to the communication device 12 to cause displaying of text or other graphical elements that convey that information.

Upon learning (or confirming his/her understanding of) how the previously-originated call has been processed by virtue of obtaining the information regarding processing of the previously-originated call, the user 10 may realize (or confirm) that potential future calls related to the previously-originated call need to be processed differently and may desire to indicate how they should be processed.

While it can be beneficial to the user 10 in some cases, this step of providing to the user 10 information regarding processing of the previously-originated call is optional and may not be effected in certain embodiments. For example, in some cases, by virtue of his/her participation in a previously-originated call and without being provided with information regarding processing of that call, the user 10 may realize that potential future calls related to that previously-originated call need to be processed differently and may desire to indicate how they should be processed.

Step 450

For purposes of this example, it is assumed that the user 10 desires to indicate how potential future calls related to the previously-originated call should be processed.

Accordingly, the user 10 interacts with the communication device 12 so as to cause the communication unit 42 to receive information regarding processing of potential future calls related to the previously-originated call.

In embodiments where the communication unit 42 implements an IVR module, this interaction may be effected by the user 10 speaking one or more utterances (possibly in response to one or more voice messages (e.g., questions) sent by the communication unit 42) resulting in the communication device 12 transmitting to the communication unit 42 one or more signals conveying the information regarding processing of potential future calls related to the previously-originated call. In such embodiments, the communication unit 42 may determine how potential future calls related to the previously-originated call should be processed by applying speech recognition to the one or more signals.

For instance, and continuing with our assumption that, in this example, the telephony feature X is the aforementioned FM/FM call forwarding feature and that the telephony feature Y is the aforementioned first distinctive ringing feature, the user 10 may speak (possibly in response to one or more voice messages (e.g., questions) sent by the communication unit 42) one or more utterances indicating that, for future calls related to the previously-originated call: one or more telephone numbers or other identifiers associated with the FM/FM call forwarding feature is to be changed; a sequence of use of these one or more telephone numbers or other identifiers is to be changed; a specific audio signal should or should no longer be produced by the communication device 12 to announce any future call originated by the communication entity 16; etc. By application of speech recognition to the one or more signals produced by the communication device 12 and conveying the one or more utterances spoken by the user 10, the communication unit 42 is able to determine how potential future calls related to the previously-originated call should be processed as indicated by the user 10.

The above example of information regarding processing of potential future calls related to the previously-originated call is presented for illustrative purposes only and is not to be considered limiting in any respect. Specifically, it will be appreciated that information regarding processing of potential future calls related to a given previously-originated call may convey various information elements depending on how such potential future calls should be processed as indicated by a party (such as the user 10).

In embodiments where the communication device 12 has a display, the user 10 may press on one or more buttons of the communication device 12 or otherwise tactilely interact therewith so as to enter text and/or act on (e.g., select) one or more graphical elements displayed on the display, resulting in the communication device 12 transmitting to the communication unit 42 one or more signals conveying the information regarding processing of potential future calls related to the previously-originated call. By processing these one or more signals, the communication unit 42 is able to determine how potential future calls related to the previously-originated call should be processed as indicated by the user 10.

Step 460

Upon receiving the information regarding processing of potential future calls related to the previously-originated call, the configuration unit 36 uses this received information to cause configuration of the call processing information associated with the user 10 (which, in this case, comprises the telephony feature information associated with the user 10). In this embodiment, this configuration may involve modifying and/or deleting one or more elements of the call processing information associated with the user 10 that is included in the database 26, and/or adding into the database 26 one or more new elements of call processing information associated with the user 10.

More particularly, in this embodiment, the configuration unit 36 accesses the database 26 and configures the call processing information included in the particular one of the records $200_1$-$200_M$ associated with the user 10 such that potential future calls related to the previously-originated call are processed in accordance with the received information regarding processing of such potential future calls. In this case, the configuration unit 36 configures the telephony feature information included in the particular one of the records $200_1$-$200_M$ associated with the user 10 in order for any potential future call related to the previously-originated call to be processed as indicated by the user 10. That is, in this example, the configuration unit 36 uses the received information regarding processing of potential future calls related to the previously-originated call to configure the information regarding the telephony feature X and/or the information regarding the telephony feature Y included in the particular one of the records $200_1$-$200_M$ associated with the user 10.

For instance, and continuing with our assumption that, in this example, the telephony feature X is the aforementioned FM/FM call forwarding feature and that the telephony feature Y is the aforementioned first distinctive ringing feature, the configuration unit 36 may, based on the received information regarding processing of potential future calls related to the previously-originated call: make a change to the one or more telephone numbers or other identifiers associated with the FM/FM call forwarding feature; alter a sequence in which these one or more telephone numbers or other identifiers are to be used; add an indication that a specific audio signal should or should no longer be produced by the communication device 12 to announce any future call originated by the communication entity 16; etc.

The above example of configuration of call processing information associated with the user 10 is presented for illustrative purposes only and is not to be considered limiting in any respect since such configuration depends on what the user 10 indicated should be performed to process future calls related to the previously-originated call.

It will thus be appreciated that, in this example, the configuration entity 32 enabled the user 10 to conveniently and efficiently effect configuration of the call processing information associated with the user 10 (which comprises, in this case, the telephony feature information associated with the user 10) on a basis of knowledge of the previously-originated call. As the user 10 participates in more and more calls over time, he/she can thus interact with the configuration entity 32 from time to time, based on knowledge of some of these previously-originated calls, in order to indicate how potential future calls should be processed. In particular, when realizing that potential future calls related to a previously-originated call need to be processed differently, the user 10 may conveniently and efficiently indicate how such potential future calls should be processed.

It will also be appreciated that, although in the above example (at step 410) the configuration entity 32 enables the user 10 to express a desire to provide information regarding processing of potential future calls related to the previously-originated call right after that call has ended, in other cases, the configuration entity 32 may enable the user 10 to express such a desire at other times.

For example, the configuration entity 32 may enable the user 10 to speak one or more utterances and/or press on one or more buttons of the communication device 12 or otherwise tactilely interact therewith, while the previously-originated call is in progress, so as to result in transmission to the communication unit 42 of a signal conveying an indication that the user 10 desires to provide information regarding processing of potential future calls related to the previously-originated call. Interaction between the user 10 and the configuration entity 32 may then proceed as described above in connection with FIG. 4.

In another example, the configuration entity 32 may enable the user 10 to initiate an interaction therewith a few minutes, hours, or days after the previously-originated call ended by pressing on one or more buttons of the communication device 12 (e.g., to enter an input command such as "*12") to cause transmission to the communication unit 42 of a signal conveying an indication that the user 10 desires to provide information regarding processing of potential future calls related to the previously-originated call. Interaction between the user 10 and the configuration entity 32 may then proceed as described above in connection with FIG. 4. In particular, in this case, at step 430, the communication unit 42 may proceed to identify the previously-originated call based on information identifying that call that is received from the user 10. As mentioned above, this information may comprise a telephone number or other identifier associated with an origin of the previously-originated call, a telephone number or other identifier associated with an intended destination of the previously-originated call, an origination time of the previously-originated call, and/or other information that uniquely identifies the previously-originated call. It may be received by the communication unit 42 as a result of the user speaking one or more utterances (possibly in response to one or more voice messages (e.g., questions) sent by the communication unit 42) and/or pressing on one or more buttons of his/her communication device (such as the communication device 12) or otherwise tactilely interacting therewith. Based on the received information, the communication unit 42 may proceed to access the memory unit 38 in an attempt to locate a particular one of the records $300_1$-$300_P$ that is associated with the previously-originated call, thereby identifying it.

In the example considered in the previous paragraph, the user 10 may use another communication device (not shown) instead of the communication device 12 in order to interact with the configuration entity 32. In this situation, the user 10 may have to interact with the configuration entity 32 in order to identify himself/herself. This may be effected by the user 10 speaking one or more utterances (possibly in response to one or more voice messages (e.g., questions) sent by the communication unit 42) and/or pressing on one or more buttons of his/her communication device (such as the communication device 12) or otherwise tactilely interacting therewith, so as to cause the other communication device to send to the configuration entity 32 one or more signals conveying information that allows the configuration entity 32 to identify the user 10. For example, this information may include a name or other party identifier associated with the user 10; authentication information (e.g., a password or voiceprint); and/or an identifier (e.g., a telephone number, IP address, or SIP URI) associated with the communication device 12, which can be determined as being associated with the user 10 by consultation of the database 26 or another memory unit (not shown) storing, for each of a plurality of parties (such as the user 10), information identifying a set of communication devices expected to be used by that party to effect telephonic communications. Based on this information, the configuration entity 32 may proceed to identify the user 10 and may then proceed to identify the previously-originated call as described in the previous paragraph. Interaction between the user 10 and the configuration entity 32 may then proceed as described above in connection with FIG. 4

In yet another example, rather than having been answered by the user 10, the previously-originated call may not have been answered by the user 10 (e.g., it may have been missed or the user 10 may have decided to not answer it). In one possible scenario, the user 10 may interact with the configuration entity 32 at a later point in time as described above. Based on this interaction, the user 10 may become aware that the previously-originated call has been missed or may recall that he/she decided to not answer that call, for instance, by virtue of the configuration entity 32 providing to the user 10 information regarding one or more unanswered calls involving the user 10. Such information may be derived from one or more of the records $300_1$-$300_P$ in the memory unit 38 that are associated with calls involving the user 10. In another possible scenario, the previously-originated call that has not been answered by the user 10 may have ultimately been forwarded to a voicemail system. In that scenario, the user 10 may become aware that the previously-originated call has been missed or may recall that he/she decided to not answer that call upon accessing the voicemail system and may then proceed to interact with the configuration entity 32 as described above (possibly during his/her session with the voicemail system). Interaction between the user 10 and the configuration entity 32 may then proceed as described above in connection with FIG. 4.

It will also be appreciated that, while the above-described example relates to an incoming call received by the communication device 12 and previously originated by the communication entity 16, the configuration entity 32 can operate in a similar manner for an outgoing call previously originated by the communication device 12 and destined for a given communication entity (such as the communication entity 16).

Figure 5:
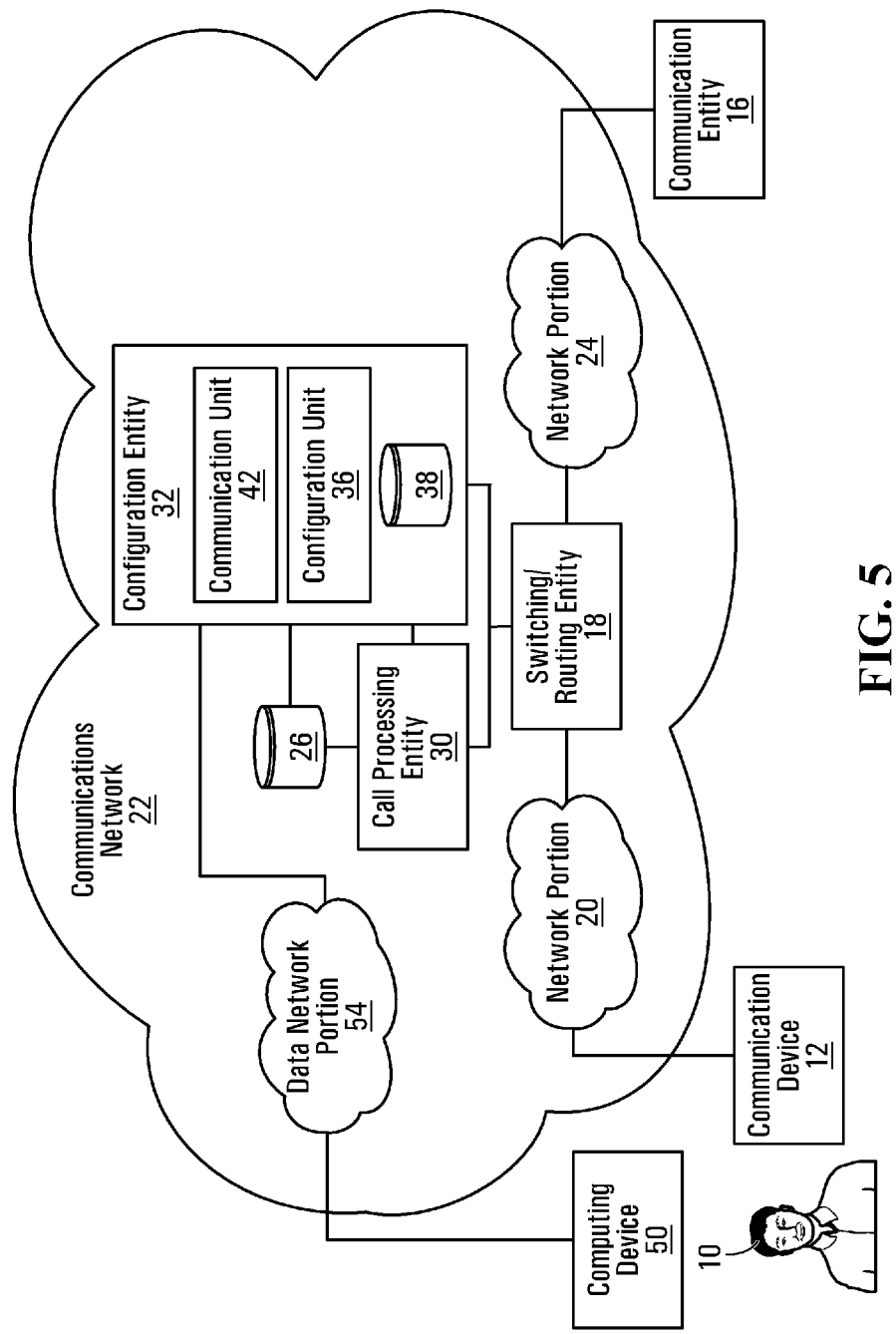
FIG. 5 illustrates a variant of the system shown in FIG. 1.

Turning now to FIG. 5, there is shown an embodiment in which the user 10 may use a computing device 50 connected to a data network portion 54 of the communications network 22 in order to avail himself/herself of the configuration feature contemplated herein. For example, in various embodiments, the computing device 50 may be implemented as a personal computer (PC) such as a desktop computer, a laptop computer, a tablet PC, or a wireless PDA. In embodiments where the communication device 12 is a soft phone or a telephony-enabled PDA, the computing device 50 and the communication device 12 may be one and the same.

The computing device 50 is provided with at least one input device such as a keyboard, a mouse, a touchscreen, a stylus, a microphone, etc., as well as a display and possibly one or more other output devices (e.g., a speaker) that enable interaction between the user 10 and the computing device 50. The computing device 50 runs a software application implementing a data network browser (e.g., a web browser) that the user 10 can interact with via the display and the at least one input device in order to access and interact with data network sites (e.g., web sites).

In this embodiment, the configuration entity 32, and particularly the communication unit 42, implements a data network site (e.g., a web site) which the user 10 may access and interact with using the computing device 50. This data network site is hereinafter referred to as a "configuration site". The data network browser enables the computing device 50 to access and interact with the configuration site over the data network portion 54.

The configuration site allows a given party (such as the user 10) to use a data network browser implemented by a computing device (such as the data network browser implemented by the computing device 50) to conveniently and efficiently effect configuration of call processing information associated with the given party (which comprises, in this case, telephony feature information associated with the given party) on a basis of knowledge of a previously-originated call involving the given party. This in effect allows the given party to indicate how potential future calls related to the previously-originated call are to be processed.

With additional reference to FIG. 6, operation of the configuration entity 32 and its interaction with the computing device 50 will now be illustrated in the context of the above-considered example in which a call previously originated by the communication entity 16 passed through the switching/routing entity 18, was processed by the call processing entity 30 and ultimately reached the communication device 12, where it was answered by the user 10 and ended after a certain period of time (for instance, with the user 10 or the party associated with the communication entity 16 hanging up). Once again, in describing this example, this call will sometimes be referred to as "the previously-originated call".

In this case, however, it is assumed that the user 10 does not use the communication device 12 to interact with the configuration entity 32 right after the previously-originated call ends, but rather uses the computing device 50 to interact with the configuration entity 32 at a later time, such as a few minutes, hours, or days after the call has ended. More particularly, the user 10 uses the computing device 50 to cause its data network browser to access and interact with the configuration site implemented by the configuration entity 32. This may involve the user 10 going through a login process in order to access certain content of the configuration site, such as content derived from information included in the particular one of the records $200_1$-$200_M$ associated with the user 10 that is stored in the database 26 or information regarding processing of calls associated with the user 10 that is stored in the memory unit 38.

Step 510

The communication unit 42 identifies the previously-originated call.

More particularly, in this embodiment, the configuration site interacts with the data network browser of the computing device 50 to cause displaying on the display thereof of a graphical element associated with a list of one or more previously-originated calls involving the user 10 (i.e., one or more calls that have been previously originated by the communication device 12 (or another communication device associated with the user 10) or that have been previously originated by a communication device associated with another party and destined for the communication device 12 (or another communication device associated with the user 10)). This list is established by the communication unit 42 accessing the memory unit 38, locating one or more of the records $300_1$-$300_P$ that are associated with calls associated with the user 10, and retrieving therefrom the information identifying the call associated with each record. In some cases, for memory considerations, this list may be established so as to contain no more than a maximum number of previously-originated calls involving the user 10.

The graphical element associated with the list of one or more previously-originated calls involving the user 10 can take on many forms. For example, in one embodiment, the graphical element may convey the list itself by conveying, for each given previously-originated call of the list, information identifying the given previously-originated call, such as a telephone number or other identifier associated with an origin of the given previously-originated call, a telephone number or other identifier associated with an intended destination of the given previously-originated call, a time at which the given previously-originated call was originated, and/or other information that uniquely identifies the given previously-originated call. In another embodiment, the graphical element may be an actionable graphical element (e.g., a graphical button or hyperlink) that can be acted on by the user 10 in order to cause display (e.g., in a new graphical window or drop-down menu) of the aforementioned information identifying each given previously-originated call of the list of one or more previously-originated calls. It will be appreciated that the graphical element associated with the list of one or more previously-originated calls involving the user 10 may be implemented in various other manners in other embodiments.

Based on the information identifying each given previously-originated call of the list of one or more previously-originated calls associated with the displayed graphical element, the user 10 uses the at least one input device of the computing device 50 in order to select a particular one of these calls, namely the previously-originated call considered in this example. For example, the user 10 can use the at least one input device of the computing device 50 to click on or otherwise select an area of the display (e.g., a link, graphical button, or checkbox) corresponding to the previously-originated call in question. This selection by the user 10 causes transmission to the communication unit 42 of a signal indicative of the previously-originated call selected by the user 10.

Upon receiving the signal indicative of the previously-originated call selected by the user 10, the communication unit 42 identifies the previously-originated call.

Step 520

Having identified the previously-originated call, the communication unit 42 provides to the user 10 information regarding processing of the previously-originated call. This information enables the user 10 to learn (or confirm his/her understanding of) how the previously-originated call has been processed, e.g., to learn about (or confirm his/her understanding of) one or more operations performed to process that call.

The information regarding processing of the previously-originated call may take on various forms depending on what was actually done to process that call. For instance, and with our previous assumption that the telephony features X and Y subscribed to by the user 10 are respectively the aforementioned FM/FM call forwarding feature and the aforementioned first distinctive ringing feature, the information regarding processing of the previously-originated call may convey to the user 10, for example: an origin of that call (e.g., a telephone number or other identifier associated with the communication entity 16); the one or more telephone numbers or other identifiers used in order for that call to ultimately reach the communication device 12; if more than one telephone number or other identifier was used, a sequence in which these one or more telephone numbers or other identifiers have been used or an indication that they were all used simultaneously; an indication that a specific audio signal (e.g., ring tone or song) was or was not produced by the communication device 12 to announce that call because it originates from the communication entity 16 which is or is not associated with a specific telephone number or other identifier for which that specific audio signal is to be used; and possibly other information as to how that call has been processed.

It is reiterated that the above example of information regarding processing of the previously-originated call is presented for illustrative purposes only and is not to be considered limiting in any respect since information regarding processing of a given previously-originated call may convey various information elements depending on how the given previously-originated call was actually processed.

In order to provide to the user 10 the information regarding processing of the previously-originated call, in this embodiment, the communication unit 42 retrieves from the particular one of the record $300_1$-$300_P$ associated with that call the information regarding one or more operations performed to process that call and uses it to derive the information regarding processing of that call. The communication unit 42 proceeds to provide to the user 10 the information regarding processing of the previously-originated call by virtue of the configuration site interacting with the data network browser of the computing device 50 to cause displaying on the display thereof of text or other graphical elements that conveys that information.

Upon learning (or confirming his/her understanding of) how the previously-originated call has been processed by virtue of obtaining the information regarding processing of the previously-originated call, the user 10 may realize (or confirm) that potential future calls related to the previously-originated call need to be processed differently and may desire to indicate how they should be processed.

While it can be beneficial to the user 10 in some cases, this step of providing to the user 10 information regarding processing of the previously-originated call is optional and may not be effected in certain embodiments. For example, in some cases, by virtue of his/her participation in a previously-originated call and without being provided with information regarding processing of that call, the user 10 may realize that potential future calls related to that previously-originated call need to be processed differently and may desire to indicate how they should be processed.

Step 530

For purposes of this example, it is assumed that the user 10 desires to indicate how potential future calls related to the previously-originated call should be processed.

Accordingly, the user 10 uses the at least one input device of the computing device 50 so as to cause the communication unit 42 to receive information regarding processing of potential future calls related to the previously-originated call. For example, the user 10 may use the at least one input device of the computing device 50 to enter text and/or act on (e.g., select) one or more graphical elements displayed on the display of the computing device 50, resulting in the computing device 50 transmitting to the communication unit 42 one or more signals conveying the information regarding processing of potential future calls related to the previously-originated call.

For instance, and continuing with our assumption that, in this example, the telephony feature X is the aforementioned FM/FM call forwarding feature and that the telephony feature Y is the aforementioned first distinctive ringing feature, the user 10 may use the at least one input device of the computing device 50 to enter text and/or act on (e.g., select) one or more graphical elements displayed on the display of the computing device 50 in order to indicate that, for future calls related to the previously-originated call: the one or more telephone numbers or other identifiers associated with the FM/FM call forwarding feature are to be changed; a sequence of use of these one or more telephone numbers or other identifiers is to be changed; a specific audio signal should or should no longer be produced by the communication device 12 to announce any future call originated by the communication entity 16; etc.

It is reiterated that the above example of information regarding processing of potential future calls related to the previously-originated call is presented for illustrative purposes only and is not to be considered limiting in any respect. Specifically, it will be appreciated that information regarding processing of potential future calls related to a given previously-originated call may convey various information elements depending on how such potential future calls should be processed as indicated by a party (such as the user 10).

Step 540

Upon receiving the information regarding processing of potential future calls related to the previously-originated call, the configuration unit 36 uses this received information to cause configuration of the call processing information associated with the user 10 (which, in this case, comprises the telephony feature information associated with the user 10). In this embodiment, this configuration may involve modifying and/or deleting one or more elements of the call processing information associated with the user 10 that is included in the database 26, and/or adding into the database 26 one or more new elements of call processing information associated with the user 10.

More particularly, in this embodiment, the configuration unit 36 accesses the database 26 and configures the call processing information included in the particular one of the records $200_1$-$200_M$ associated with the user 10 such that potential future calls related to the previously-originated call are processed in accordance with the received information regarding processing of such potential future calls. In this case, the configuration unit 36 configures the telephony feature information included in the particular one of the records $200_1$-$200_M$ associated with the user 10 in order for any potential future call related to the previously-originated call to be processed as indicated by the user 10. That is, in this example, the configuration unit 36 uses the received information regarding processing of potential future calls related to the previously-originated call to configure the information regarding the telephony feature X and/or the information regarding the telephony feature Y included in the particular one of the records $200_1$-$200_M$ associated with the user 10.

For instance, and continuing with our assumption that, in this example, the telephony feature X is the aforementioned FM/FM call forwarding feature and that the telephony feature Y is the aforementioned first distinctive ringing feature, the configuration unit 36 may, based on the received information regarding processing of potential future calls related to the previously-originated call: make a change to one or more telephone numbers or other identifiers associated with the FM/FM call forwarding feature; alter a sequence in which these one or more telephone numbers or other identifiers are to be used; add an indication that a specific audio signal should or should no longer be produced by the communication device 12 to announce any future call originated by the communication entity 16; etc.

It is reiterated that the above example of configuration of call processing information associated with the user 10 is presented for illustrative purposes only and is not to be considered limiting in any respect since such configuration depends on what the user 10 indicated should be performed to process future calls related to the previously-originated call.

It will thus be appreciated that, in this example, the configuration entity 32, via its configuration site, enabled the user 10 to conveniently and efficiently effect configuration of the call processing information associated with the user 10 (which comprises, in this case, the telephony feature information associated with the user 10) on a basis of knowledge of the previously-originated call. As the user 10 participates in more and more calls over time, he/she can thus use the computing device 50 to interact from time to time with the configuration site, based on knowledge of some of these previously-originated calls, in order to indicate how potential future calls should be processed. In particular, when realizing that potential future calls related to a previously-originated call need to be processed differently, the user 10 may conveniently and efficiently indicate how such potential future calls should be processed.

It will also be appreciated that, while the above-described example relates to an incoming call received by the communication device 12 and previously originated by the communication entity 16, the configuration entity 32, and particularly the configuration site, can operate in a similar manner for an outgoing call previously originated by the communication device 12 and destined for a given communication entity (such as the communication entity 16).

It will further be appreciated that the configuration entity 32 may be provided with other functionality to facilitate interaction of a party (such as the user 10) therewith.

For example, in some embodiments, the configuration entity 32 may be operative to send and/or receive one or more electronic messages such as electronic mail (email) messages, instant messaging (IM) messages (including IM voice messages), or text messages (e.g., Short Messaging Service (SMS) or Multimedia Messaging Service (MMS) messages) to and/or from a communication device (such as the communication device 12) and/or a computing device (such as the computing device 50) associated with a party (such as the user 10). This possible functionality of the configuration entity 32 will now be illustrated in the context of the above-considered example in which a call previously originated by the communication entity 16 passed through the switching/routing entity 18, was processed by the call processing entity 30 and ultimately reached the communication device 12, where it was answered by the user 10 and ended after a certain period of time (for instance, with the user 10 or the party associated with the communication entity 16 hanging up). This call will sometimes be referred to as "the previously-originated call" and, for purposes of this examples, it is assumed that the user 10 does not use the communication device 12 to interact with the configuration entity 32 right after the previously-originated call ends, but rather uses the communication device 12 and/or the computing device 50 to interact with the configuration entity 32 at a later time, such as a few minutes, hours, or days after the call has ended.

Thus, in some embodiments, after the previously-originated call ends or while it is in progress, the communication unit 42 may send one or more electronic messages destined for the communication device 12 and/or the computing device 50. The communication unit 42 may obtain destination information for the one or more electronic messages by consulting the particular one of the records $200_1$-$200_M$ of the database 26 that is associated with the user 10 or by consulting another memory unit (not shown) storing such information. Depending on its intended destination, each electronic message may be an email message, an IM message, or a text message and conveys an indication of an opportunity to provide information regarding processing of potential future calls related to the previously-originated call. For example, each electronic message may convey one or more of: information identifying the previously-originated call (e.g., obtained from the memory unit 38); information regarding one or more operations performed to process the previously-originated call (e.g., obtained from the memory unit 38); a hyperlink or a data network address associated with the configuration site implemented by the configuration entity 32; an email address associated with the configuration entity 32; and information indicative of an opportunity for the user 10 to provide information regarding processing of potential future calls related to the previously-originated call (e.g., "Click here if you would like for future related calls to be processed differently."; "Dial *12 if would you like to indicate how future related calls are to processed."; etc.).

In these embodiments, transmission to the communication device 12 and/or the computing device 50 of the one or more electronic messages may be effected automatically by the communication unit 42, without requiring any input from the user 10. This automatic transmission may be effected by the communication unit 42 for any previously-originated call (such as the one under consideration in this example). Alternatively, the communication unit 42 may effect this automatic transmission for a given previously-originated call only when one or more conditions are satisfied. For example, the one or more conditions may be defined in terms of the information regarding one or more operations performed to process the given previously-originated call that is included in the particular one of the records $300_1$-$300_P$ of the memory unit 38 that is associated with that call (e.g., if a relatively large number of operations have been performed to process the given previously-originated call, the communication unit 42 may proceed with effecting this automatic transmission). As another example, the one or more conditions may be defined in terms of one or more characteristics of the given previously-originated call (e.g., if the given previously-originated call has an origin, intended destination, and/or origination time being encountered for the first time by the configuration entity 32, the communication unit 42 may proceed with effecting this automatic transmission).

As a possible alternative, in these embodiments, transmission to the communication device 12 and/or the computing device 50 of the one or more electronic messages may be effected by the communication unit 42 in response to receipt of an electronic message (e.g., an email, IM, or text message) requesting such transmission and originated by the communication device 12 or the computing device 50 as a result of interaction of the user 10 with that device.

Upon receipt of the one or more electronic messages at the communication device 12 and/or the computing device 50, the user 10 may use the communication device 12 or the computing device 50 to interact with the configuration entity 32 as previously described herein in order to effect configuration of call processing information associated with the user 10.

In a similar manner, in some embodiments, the user 10 may use the communication device 12 and/or the computing device 50 to cause transmission to the communication unit 42 of one or more electronic messages (e.g., email, IM, or text messages) conveying information identifying the previously-originated call and/or information regarding processing of potential future calls related to the previously-originated call. In such embodiments, the communication unit 42 may identify the previously-originated call and/or determine how potential future calls related to the previously-originated call should be processed by processing to the received one or more electronic messages.

Those skilled in the art will appreciate that, in some embodiments, certain functionality of a given component described herein (including the configuration entity 32) may be implemented as pre-programmed hardware or firmware elements (e.g., application specific integrated circuits (ASICs), electrically erasable programmable read-only memories (EEPROMs), etc.) or other related elements. In other embodiments, a given component described herein (including the configuration entity 32) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A method implemented by a network entity, said method comprising:
   receiving from a communication device an indication of a desire to provide information regarding processing of potential future calls related to a previously-originated call;
   identifying a call record of the previously-originated call from a plurality of call records, each of the plurality of call records associated with a respective previous call and storing call processing information regarding one or more call processing operations performed to process the respective call;
   receiving from the communication device modification information regarding processing of a potential future call related to the previously-originated call and specifying how one or more call processing operations should be performed; and
   modifying the call processing information using the received modification information so that a potential future call related to the previously-originated call is processed based on the modified call processing information.

2. A method as claimed in claim 1, wherein the call processing information comprises telephony feature information.

3. A method as claimed in claim 1, wherein receiving the modification information comprises:
   receiving at least one signal; and
   processing the at least one signal to obtain the modification information.

4. A method as claimed in claim 3, wherein processing the at least one signal comprises applying speech recognition to the at least one signal to obtain the modification information.

5. A method as claimed in claim 1, wherein receiving the modification information comprises:
   receiving data generated by a data network browser; and
   processing the data to obtain the modification information.

6. A method as claimed in claim 1, wherein receiving the modification information comprises:
   receiving at least one electronic message; and
   processing the at least one electronic message to obtain the modification information.

7. A method as claimed in claim 6, wherein each of the at least one electronic message is one of an email message, an instant messaging message, and a text message.

8. A method as claimed in claim 1, wherein identifying the call record of the previously-originated call comprises identifying an in-progress call or identifying a most recently terminated call.

9. A method as claimed in claim 1, wherein identifying the call record of the previously-originated call comprises:
   receiving information enabling identification of the previously-originated call; and
   using the information enabling identification of the previously-originated call to identify the previously-originated call.

10. A method as claimed in claim 9, wherein receiving the information enabling identification of the previously-originated call comprises:
    receiving data generated by a data network browser; and
    processing the data to obtain the information enabling identification of the previously originated call.

11. A method as claimed in claim 9, wherein receiving the information enabling identification of the previously-originated call comprises:
    receiving at least one electronic message; and
    processing the at least one electronic message to obtain the information enabling identification of the previously-originated call.

12. A method as claimed in claim 11, wherein each of the at least one electronic message is one of an email message, an instant messaging message, and a text message.

13. A method as claimed in claim 1, wherein identifying the previously-originated call comprises consulting a database to identify the previously-originated call.

14. A method as claimed in claim 1, further comprising, prior to receiving the modification information, providing the call processing information regarding one or more call processing operations performed to process the previously-originated call of the identified call record.

15. A method as claimed in claim 14, wherein providing the call processing information comprises causing transmission of at least one voice message conveying the call processing information.

16. A method as claimed in claim 14, wherein providing the call processing information comprises causing display of at least one graphical element conveying the call processing information.

17. A method as claimed in claim 14, wherein providing the call processing information comprises causing transmission of at least one electronic message conveying the call processing information.

18. A method as claimed in claim 17, wherein each of the at least one electronic message is one of an email message, an instant messaging message, and a text message.

19. A method as claimed in claim 14, wherein providing the call processing information comprises accessing a database to derive the call processing information.

20. A method as claimed in claim 1, wherein modifying the call processing information using the received modification information comprises accessing a database.

21. A method as claimed in claim 1, further comprising, prior to receiving the indication of the desire to provide information regarding processing potential further calls, enabling a user to express the desire to provide information regarding processing of potential future calls.

22. A method as claimed in claim 21, wherein enabling the user comprises causing transmission of a voice message eliciting from the user the indication of the desire to provide the information regarding processing of the potential future calls.

23. A method as claimed in claim 21, wherein enabling the user comprises causing transmission of a signal to cause display of at least one graphical element eliciting from the user the indication of the desire to provide the information regarding processing of the potential future calls.

24. A method as claimed in claim 21, wherein enabling the user comprises being attentive to receipt of a signal indicative of the desire of the user to provide the information regarding processing of the potential future calls.

25. A method as claimed in claim 21, wherein enabling the user comprises causing transmission of at least one electronic message eliciting from the user the indication of the desire to provide information regarding processing of the potential future calls.

26. A method as claimed in claim 25, wherein each of the at least one electronic message is one of an email message, an instant messaging message, and a text message.

27. A configuration entity comprising:
a communication unit operative for:
receiving from a communication device an indication of a desire to provide information regarding processing of potential future calls related to a previously-originated call;
identifying a call record of the previously-originated call from a plurality of call records, each of the plurality of call records associated with a respective previous call and storing call processing information regarding one or more call processing operations performed to process the respective call;
receiving from the communication device modification information regarding processing of a potential future call related to the previously-originated call and specifying how one or more call processing operations should be performed; and
a configuration unit operative for modifying the call processing information using the received modification information so that a potential future call related to the previously-originated call is processed based on the modified call processing information.

28. A configuration entity as claimed in claim 27, wherein the call processing information comprises telephony feature information.

29. A configuration entity as claimed in claim 27, wherein receiving the modification information comprises:
receiving at least one signal; and
processing the at least one signal to obtain the modification information.

30. A configuration entity as claimed in claim 29, wherein processing the at least one signal comprises applying speech recognition to the at least one signal to obtain the modification information.

31. A configuration entity as claimed in claim 27, wherein receiving the modification information comprises:
receiving data generated by a data network browser; and
processing the data to obtain the modification information.

32. A configuration entity as claimed in claim 27, wherein receiving the modification information comprises:
receiving at least one electronic message; and
processing the at least one electronic message to obtain the modification information.

33. A configuration entity as claimed in claim 32, wherein each of the at least one electronic message is one of an email message, an instant messaging message, and a text message.

34. A configuration entity as claimed in claim 27, wherein identifying the call record of the previously-originated call comprises identifying an in-progress call or identifying a most recently terminated call.

35. A configuration entity as claimed m claim 27, wherein identifying the call record of the previously-originated call comprises:
receiving information enabling identification of the previously-originated call; and
using the information enabling identification of the previously-originated call to identify the previously-originated call.

36. A configuration entity as claimed in claim 35, wherein receiving the information enabling identification of the previously-originated call comprises:
receiving data generated by a data network browser; and
processing the data to obtain the information enabling identification of the previously originated call.

37. A configuration entity as claimed in claim 35 wherein receiving the information enabling identification of the previously-originated call comprises:
receiving at least one electronic message; and
processing the at least one electronic message to obtain the information enabling identification of the previously-originated call.

38. A configuration entity as claimed in claim 37, wherein each of the at least one electronic message is one of an email message, an instant messaging message, and a text message.

39. A configuration entity as claimed in claim 27, wherein identifying the previously-originated call comprises consulting a database to identify the previously-originated call.

40. A configuration entity as claimed in claim 27, wherein said communication unit is further operative for, prior to receiving the modification information, providing the call processing information regarding one or more call processing operations performed to process the previously-originated call of the identified call record.

41. A configuration entity as claimed in claim 40, wherein providing the call processing information comprises causing transmission of at least one voice message conveying the call processing information.

42. A configuration entity as claimed in claim 40, wherein providing the call processing information comprises causing display of at least one graphical element conveying the call processing information.

43. A configuration entity as claimed in claim 40, wherein providing the call processing information comprises causing transmission of at least one electronic message conveying the call processing information.

44. A configuration entity as claimed in claim 43, wherein each of the at least one electronic message is one of an email message, an instant messaging message, and a text message.

45. A configuration entity as claimed in claim 40, wherein providing the call processing information comprises accessing a database to derive the call processing information.

46. A configuration entity as claimed in claim 27, wherein modifying the call processing information using the received modification information comprises accessing a database.

47. A configuration entity as claimed in claim 27, wherein said communication unit is further operative for, prior to receiving the indication of the desire to provide information regarding processing potential further calls, enabling a user to express the desire to provide information regarding processing of potential future calls.

48. A configuration entity as claimed in claim 47, wherein enabling the user comprises causing transmission of a voice message eliciting from the user the indication of the desire to provide the information regarding processing of the potential future calls.

49. A configuration entity as claimed in claim 47, wherein enabling the user comprises causing transmission of a signal to cause display of at least one graphical element eliciting from the user the indication of the desire to provide the information regarding processing of the potential future calls.

50. A configuration entity as claimed in claim 47, wherein enabling the user comprises being attentive to receipt of a signal indicative of the desire of the user to provide the information regarding processing of the potential future calls.

51. A configuration entity as claimed in claim 47, wherein enabling the user comprises causing transmission of at least one electronic message eliciting from the user the indication of the desire to provide information regarding processing of the potential future calls.

52. A configuration entity as claimed in claim 51, wherein each of the at least one electronic message is one of an email message, an instant messaging message, and a text message.

53. A non-transitory computer-readable storage medium comprising a program element for execution by a processing unit to implement a configuration entity, said program element comprising:
- first program code for receiving from a communication device an indication of a desire to provide information regarding processing of potential future calls related to a previously-originated call;
- second program code for identifying a call record of the previously-originated call from a plurality of call records, each of the plurality of call records associated with a respective previous call and storing call processing information regarding one or more call processing operations performed to process the respective call;
- third program code for receiving from the communication device modification information regarding processing of a potential future call related to the previously-originated call and specifying how one or more call processing operations should be performed; and
- fourth program code for modifying the call processing information using the received modification information so that a potential future call related to the previously-originated call is processed based on the modified call processing information.

* * * * *